United States Patent
Weinmeier

(10) Patent No.: US 8,102,684 B2
(45) Date of Patent: Jan. 24, 2012

(54) RELIEF CIRCUIT

(75) Inventor: Harald Weinmeier, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 368 days.

(21) Appl. No.: 12/524,067

(22) PCT Filed: Dec. 7, 2007

(86) PCT No.: PCT/EP2007/063485
§ 371 (c)(1),
(2), (4) Date: Jul. 22, 2009

(87) PCT Pub. No.: WO2008/089867
PCT Pub. Date: Jul. 31, 2008

(65) Prior Publication Data
US 2010/0103706 A1    Apr. 29, 2010

(30) Foreign Application Priority Data

Jan. 23, 2007   (AT) ................................. A 110/2007

(51) Int. Cl.
    *H02H 7/122* (2006.01)
(52) U.S. Cl. .......................... 363/58; 363/56.12; 361/88
(58) Field of Classification Search .................... 363/16, 363/17, 20, 21.06, 21.12, 37, 56.12, 56.04, 363/57, 58, 65, 98, 132; 323/222, 271–272, 323/282–285; 361/88, 91.3, 94, 699, 702
See application file for complete search history.

(56) References Cited

U.S. PATENT DOCUMENTS

| | | | |
|---|---|---|---|
| 3,182,258 A | | 5/1965 | Potter |
| 3,913,036 A | | 10/1975 | Hook |
| 4,017,784 A | * | 4/1977 | Simmons et al. ............... 363/17 |
| 4,403,269 A | * | 9/1983 | Carroll ......................... 361/91.7 |
| 4,639,849 A | * | 1/1987 | Noworolski et al. ....... 363/56.05 |
| 5,636,114 A | * | 6/1997 | Bhagwat et al. ........... 363/56.12 |
| 5,838,524 A | * | 11/1998 | Phillips ........................... 361/18 |
| 6,055,161 A | * | 4/2000 | Church et al. .................. 363/22 |
| 6,563,723 B2 | * | 5/2003 | Nadot et al. .................... 363/57 |
| 6,597,550 B1 | | 7/2003 | Chey |
| 2002/0044459 A1 | | 4/2002 | Tsubota et al. |

FOREIGN PATENT DOCUMENTS

| | | |
|---|---|---|
| CN | 1377125 A | 10/2002 |
| DE | 2026434 A1 | 12/1971 |
| EP | 0431817 A1 | 6/1991 |
| SU | 1330713 A1 | 8/1987 |
| SU | 1820985 A3 | 6/1993 |

* cited by examiner

*Primary Examiner* — Rajnikant Patel

(57) ABSTRACT

A circuit arrangement for limiting excessive voltages by a forward delay time of a first diode is described. The first diode is alternately switched in a non-conducting direction and a conducting direction by switching a circuit element. The first diode is series-connected to a first capacitor and a pre-charging circuit is provided for the first capacitor, the pre-charging circuit charging the first capacitor while the first diode is switched in the non-conducting direction. The pre-charging circuit charges the first capacitor more strongly than an excessive voltage of the first diode with regard to the amount.

20 Claims, 2 Drawing Sheets

RELIEF CIRCUIT

CROSS REFERENCE TO RELATED APPLICATIONS

This application is the U.S. National Stage of International Application No. PCT/EP2007/063485 filed Dec. 7, 2007, and claims the benefit thereof. The International Application claims the benefits of Austrian Patent Application No. A 110/2007 AT filed Jan. 23, 2007; both of the applications are incorporated by reference herein in their entirety.

FIELD OF INVENTION

The invention relates to a circuit arrangement for limiting voltage overshoots due to the forward recovery time of a diode which is switched alternately between reverse-biased (non-conducting) and forward-biased (conducting) by switching of a switching element.

BACKGROUND OF INVENTION

Voltage overshoots due to the forward recovery time for diodes are problematic in particular in the case of very fast switching operations. With slow switching operations, the diode is usually made conducting by application of the forward bias voltage, which in the case of silicon diodes is in the region of about 0.7 V. With fast switching times, on the other hand, it already becomes noticeable that the diode becomes conductive only after a finite time has elapsed. In particular when a switch is made from reverse-biased to forward-biased, a certain period of time is required in order to distribute the charge carriers over the entire cross-section of the space charge region and, as it were, to "flood" said region with charge carriers. This finite time is critical in particular when high currents are to be conducted through the diode, when, for instance, the diode is a snubbing diode for inductances. In these cases the diode does not become conducting already at the forward bias voltage, as is critical for slow switching operations, but only at higher voltages. Said higher forward bias voltage during fast switching operations is referred to as voltage overshoot. In this case the voltage overshoot is a function of the current rise rate (mostly specified in A/µs) and can be found in the corresponding data sheets for the particular diode.

These voltage overshoots due to the forward recovery time for diodes are conventionally counteracted by an over-dimensioning of the components requiring protection. A further possibility consists in slowing down the switching operations, although this entails other disadvantages, such as, for instance, additional switching losses in switching components.

SUMMARY OF INVENTION

It is an object of the invention to avoid these disadvantages and to provide a circuit arrangement which limits voltage overshoots due to the forward recovery time for diodes. This object is achieved by a circuit as claimed in the claims.

A circuit arrangement for limiting voltage overshoots due to the forward recovery time of a first diode which is switched alternately between reverse-biased (non-conducting) and forward-biased (conducting) by switching of a switching element is provided. In this case it is provided that the first diode is connected in series with a first capacitor, and a pre-charging circuit for the first capacitor is provided, said circuit charging the first capacitor while the first diode is switched to reverse bias. The pre-charging at the first capacitor and the voltage associated therewith causes the first diode to start conducting by said voltage value earlier. The voltage overshoot is therefore reduced. If said voltage value exceeds the voltage overshoot of the first diode, the voltage overshoot can be avoided completely.

The first diode can be connected in series with the first capacitor on the anode side. For this situation, it is proposed that the pre-charging circuit includes a second capacitor connected in parallel with the first diode, and a third diode, the third diode being connected on the anode side to the second capacitor, and on the cathode side to the side of the first capacitor facing the first diode.

However, the first diode can alternatively also be connected in series with the first capacitor on the cathode side. In this case, a pre-charging circuit can be realized for example such that the pre-charging circuit includes a second capacitor connected in parallel with the first diode, and a third diode, the third diode being connected on the cathode side to the second capacitor, and on the anode side to the side of the first capacitor facing the first diode.

The first capacitor is connected in parallel with a second diode which is connected co-directionally with the first diode. In this arrangement the second diode takes over the current flowing through the first capacitor as soon as it becomes conducting in relation to the charge state of the first capacitor. The term "connected co-directionally", in this context, means that when the current flows in the same direction the two diodes are either both switched to reverse-biased (non-conducting) or both switched to forward-biased (conducting).

A preferred application of the switching arrangement is in transformer circuits such as occur in inverters or switched-mode power supplies. The switching element is connected on the primary side of a transformer circuit in series with the primary winding of a transformer, and primary winding and switching element are connected to a direct-current voltage source, the first diode being connected in the circuit as a snubbing diode for the primary winding.

Further, a switched-mode power supply having a circuit arrangement as described is provided.

BRIEF DESCRIPTION OF THE DRAWINGS

The invention is explained in more detail below with reference to an exemplary embodiment and with the aid of the accompanying figures, in which.

DETAILED DESCRIPTION OF INVENTION

Figure 1:
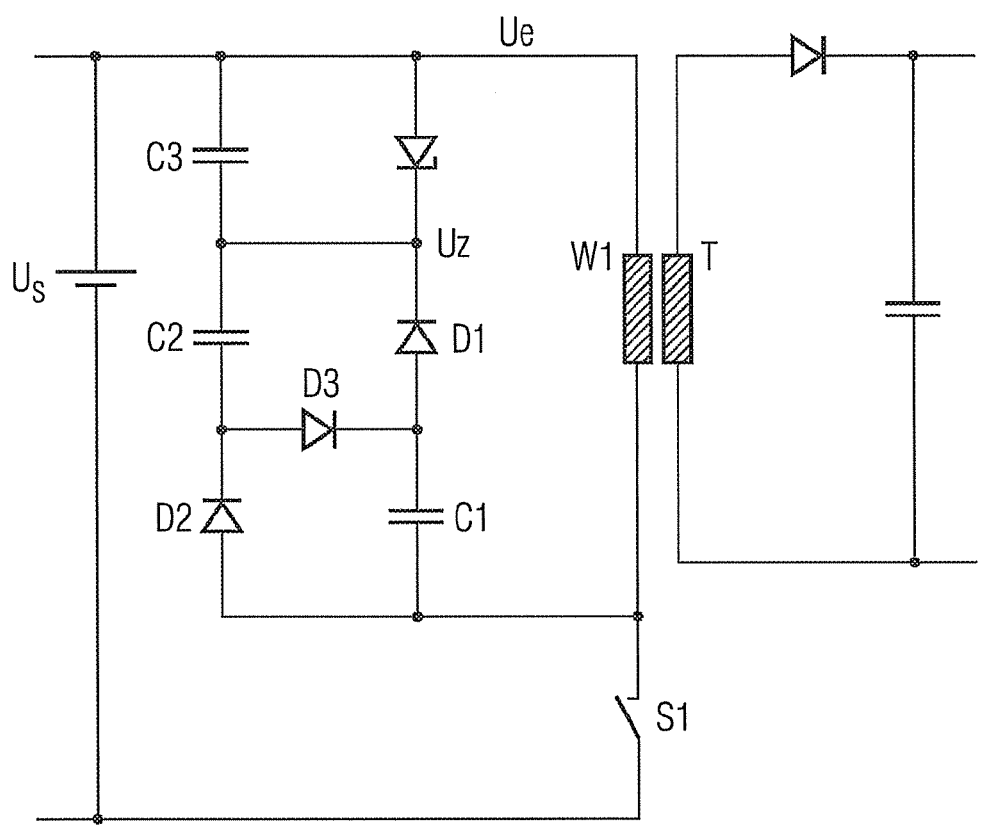
FIG. 1 shows a first exemplary circuit of the inventive circuit arrangement.

FIG. 1 shows a circuit arrangement having a switching element S1, which is typically a semiconductor switch, in particular a power switch. In the exemplary embodiment shown the switching element S1 is connected on the primary side of a transformer circuit in series with the primary winding W1 of a transformer T, and primary winding W1 and switching element S1 are connected to a direct-current voltage source $U_S$. By periodically opening and closing the switching element S1 the direct-current voltage of the direct-current voltage source $U_S$ is converted into voltage pulses which are transferred via the transformer T onto the secondary side of the transformer circuit.

FIG. 1 also shows that a first diode D1 is connected in the circuit as a snubbing diode for the primary winding W1. The first diode D1 is switched to reverse-biased in relation to the direct-current voltage source $U_S$. If the switching element S1 is open, current flows via the intermediate circuit of the first diode D1, such that the first diode D1 is switched alternately between reverse-biased and forward-biased as a function of the switch state of the switching element S1.

In order to limit voltage overshoots due to the forward recovery time of the first diode D1, the latter is inventively connected on the anode side in series with a first capacitor C1. Provided in addition is a pre-charging circuit for the first capacitor C1 which positively charges the side of the first capacitor C1 facing the first diode D1, while the first diode D1 is switched to reverse-biased. The first capacitor C1 is also connected in parallel with a second diode D2 which is connected co-directionally with the first diode D1.

In the exemplary embodiment shown in FIG. 1 the pre-charging circuit includes a second capacitor C2 connected in parallel with the first diode D1, and a third diode D3, the third diode D3 being connected on the anode side to the second capacitor C2, and on the cathode side to the side of the first capacitor C1 facing the first diode D1.

Furthermore, the parallel circuit of first diode D1 and second capacitor C2 is connected in series with a parallel circuit of a third capacitor C3 and a Zener diode. These switching elements are purely optional and simply illustrate one means of protecting the switching element S1 by building a direct-current counter voltage which protects the switching element S1 but does not disrupt the normal operation of the transformer T.

Figure 2:
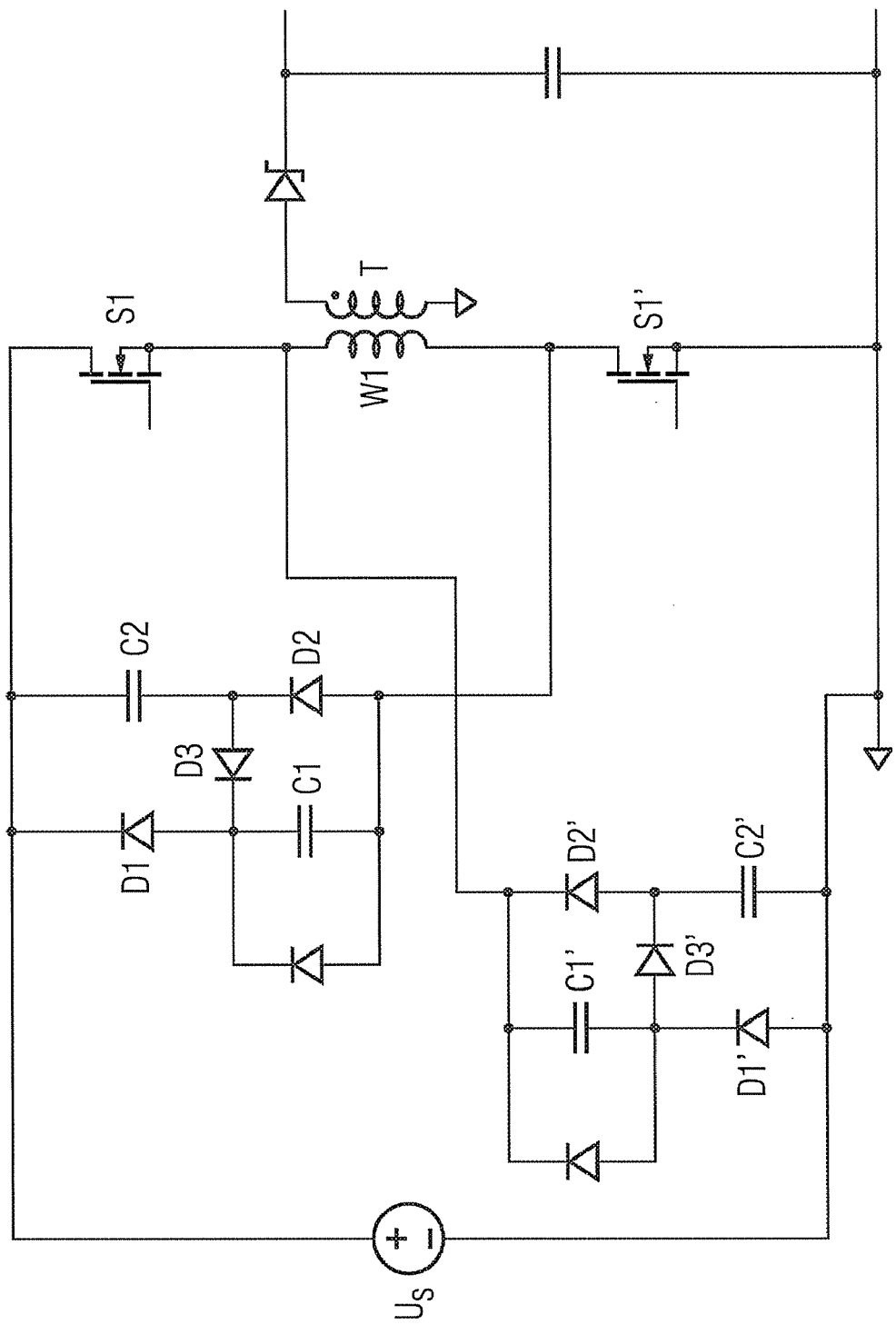
FIG. 2 shows a further embodiment variant of the inventive circuit arrangement.

In practice, however, in contrast to the embodiment variant according to FIG. 1, an attempt will be made to use the scattered energy in the primary circuit of the transformer T following opening of the switching element S1, for instance with the aid of a circuit in which the scattered energy is fed back into a voltage source intermediate circuit. An example of this is shown in FIG. 2. FIG. 2 shows a circuit arrangement in which a further switching element S1' is connected in series with the primary winding W1. The two switching elements S1, S1' are each assigned an intermediate circuit comprising the snubbing diodes D1 and D1'. The inventive circuit arrangement is used with both snubbing diodes D1, D1', albeit in the form of two different exemplary embodiments, i.e. with an anode-side arrangement of the first capacitor C1 in relation to the first diode D1, and with a cathode-side arrangement of the first capacitor C1' in relation to the first diode D1'. In the latter case the pre-charging circuit accordingly includes a second capacitor C2' connected in parallel with the first diode D1', and a third diode D3', the third diode D3' being connected on the cathode side to the second capacitor C2', and on the anode side to the side of the first capacitor C1' facing the first diode D1'.

The switching-related states of the inventive circuit arrangement can be subdivided into four phases and are explained with reference to FIG. 1.

In a first phase, the switching element S1 is closed and the first diode D1 is switched to reverse-biased. During the reverse bias phase the first capacitor C1 is pre-charged via the pre-charging circuit consisting of the second capacitor C2 and the third diode D3 with a voltage which advantageously equals a fraction of the reverse voltage at the first diode D1. In this case the side of the first capacitor C1 facing the first diode D1 is positively charged.

In a second phase, the switching element S2 is opened and the voltage at the switching element S1 becomes more positive until the sum of the voltage at the switching element S1 and that at the first capacitor C1 becomes more positive than the sum of the voltages $U_E$ and $U_Z$ (see FIG. 1).

In a third phase, the first diode D1 now becomes conducting and the voltage overshoot described in the introduction occurs. Given suitable dimensioning, said voltage overshoot is less than the voltage at the first capacitor C1, with the result that in this phase the voltage at the switching element S1 always remains below the sum of the voltages $U_E$ and $U_Z$. Following the turn-on delay of the first diode D1 the potential at the anode of the first diode D1 lies by only a diode threshold above the potential at its cathode. The third phase ends after the voltage at the first capacitor C1 becomes negative and the second diode D2 becomes conducting. It should be noted here that voltage overshoots at the second diode D2 are negligible in practice because the voltage rise at the second diode D2 is less, and it can be dimensioned with smaller reverse voltages. Thus, the second diode D2 behaves in a noncritical manner in terms of its forward recovery time.

In a fourth phase, the second diode D2 takes over the current that previously flowed through the first capacitor C1. The voltage at the switching element S1 now amounts to the sum of the voltages $U_E$ and $U_Z$ and two diode thresholds.

Accordingly, voltage overshoots due to the forward recovery time in the case of the first diode D1 are limited with the aid of the circuit arrangement according to the invention, which is of advantage in particular in the case of very fast switching operations.

The invention claimed is:

1. A circuit arrangement for limiting voltage overshoots, comprising:
    a first diode which is switched alternately between reverse-biased (non-conducting) and forward-biased (conducting);
    a switching element for switching the first diode;
    a first capacitor, the first diode being connected in series with the first capacitor;
    a pre-charging circuit for the first capacitor, wherein the first capacitor is charged while the first diode is switched to reverse-biased.

2. The circuit arrangement as claimed in claim 1, wherein the pre-charging circuit for the first capacitor charges the first capacitor more strongly in teens of absolute value than a voltage overshoot of the first diode while the first diode is switched to reverse-biased.

3. The circuit arrangement as claimed in claim 1, wherein the first diode has an anode side and is connected on the anode side in series with the first capacitor.

4. The circuit arrangement as claimed in claim 2, wherein the first diode has an anode side and is connected on the anode side in series with the first capacitor.

5. The circuit arrangement as claimed in claim 3, wherein the pre-charging circuit includes
    a second capacitor connected in parallel with the first diode, and
    a third diode having an anode and a cathode side, the third diode being connected on the anode side to the second capacitor and on the cathode side to a side of the first capacitor facing the first diode.

6. The circuit arrangement as claimed in claim 4, wherein the pre-charging circuit includes
    a second capacitor connected in parallel with the first diode, and
    a third diode having an anode and a cathode side, the third diode being connected on the anode side to the second capacitor and on the cathode side to a side of the first capacitor facing the first diode.

7. The circuit arrangement as claimed in claim 1, wherein the first diode has a cathode side and is connected in series with the first capacitor on the cathode side.

8. The circuit arrangement as claimed in claim 2, wherein the first diode has a cathode side and is connected in series with the first capacitor on the cathode side.

9. The circuit arrangement as claimed in claim 7, wherein the pre-charging circuit includes
   a second capacitor connected in parallel with the first diode, and
   a third diode having an anode and a cathode side, the third diode being connected on the cathode side to the second capacitor and on the anode side to a side of the first capacitor facing the first diode.

10. The circuit arrangement as claimed in claim 8, wherein the pre-charging circuit includes
    a second capacitor connected in parallel with the first diode, and
    a third diode having an anode and a cathode side, the third diode being connected on the cathode side to the second capacitor and on the anode side to a side of the first capacitor facing the first diode.

11. The circuit arrangement as claimed in claim 1, further comprising:
    a second diode, wherein the first capacitor is connected in parallel with the second diode, the second diode being connected co-directionally with the first diode.

12. The circuit arrangement as claimed in claim 1, further comprising:
    a transformer circuit including a transformer with a primary winding, the switching element being connected in series with the primary winding of the transformer; and
    a direct-current voltage source, the primary winding and the switching element being connected to the direct-current voltage source, wherein the first diode is connected as a relief diode for the primary winding.

13. A switched-mode power supply, comprising:
    a circuit arrangement for limiting voltage overshoots, including
      a first diode which is switched alternately between reverse-biased (non-conducting) and forward-biased (conducting);
      a switching element for switching the first diode;
      a first capacitor, the first diode being connected in series with the first capacitor;
      a pre-charging circuit for the first capacitor, wherein the first capacitor is charged while the first diode is switched to reverse-biased.

14. The switched-mode power supply as claimed in claim 13, wherein the pre-charging circuit for the first capacitor charges the first capacitor more strongly in teens of absolute value than a voltage overshoot of the first diode while the first diode is switched to reverse-biased.

15. The switched-mode power supply as claimed in claim 13, wherein the first diode has an anode side and is connected on the anode side in series with the first capacitor.

16. The switched-mode power supply as claimed in claim 15, wherein the pre-charging circuit includes
    a second capacitor connected in parallel with the first diode, and
    a third diode having an anode and a cathode side, the third diode being connected on the anode side to the second capacitor and on the cathode side to a side of the first capacitor facing the first diode.

17. The switched-mode power supply as claimed in claim 13, wherein the first diode has a cathode side and is connected in series with the first capacitor on the cathode side.

18. The switched-mode power supply as claimed in claim 17, wherein the pre-charging circuit includes
    a second capacitor connected in parallel with the first diode, and
    a third diode having an anode and a cathode side, the third diode being connected on the cathode side to the second capacitor and on the anode side to a side of the first capacitor facing the first diode.

19. The switched-mode power supply as claimed in claim 13, further comprising:
    a second diode, wherein the first capacitor is connected in parallel with the second diode, the second diode being connected co-directionally with the first diode.

20. The switched-mode power supply as claimed in claim 13, further comprising:
    a transformer circuit including a transformer with a primary winding, the switching element being connected in series with the primary winding of the transformer; and
    a direct-current voltage source, the primary winding and the switching element being connected to the direct-current voltage source, wherein the first diode is connected as a relief diode for the primary winding.

* * * * *